(12) United States Patent
Barrett, Jr.

(10) Patent No.: US 7,946,750 B2
(45) Date of Patent: May 24, 2011

(54) COMPOSITION FOR AND METHOD OF PUMPING CONCRETE

(75) Inventor: William G. Barrett, Jr., Marietta, GA (US)

(73) Assignee: Innovative Concrete Solutions, Inc., Douglasville, GA (US)

( * ) Notice: Subject to any disclaimer, the term of this patent is extended or adjusted under 35 U.S.C. 154(b) by 796 days.

(21) Appl. No.: 11/466,243

(22) Filed: Aug. 22, 2006

(65) Prior Publication Data

US 2007/0047379 A1 Mar. 1, 2007

Related U.S. Application Data

(60) Provisional application No. 60/710,386, filed on Aug. 23, 2005.

(51) Int. Cl.
*B28C 5/00* (2006.01)
*B28C 7/12* (2006.01)
*B65G 53/32* (2006.01)
*C04B 24/10* (2006.01)

(52) U.S. Cl. ................ 366/3; 417/53; 417/900

(58) Field of Classification Search ........... 366/1, 2, 366/3, 4, 5, 6, 7, 8; 48/100; 335/284; 137/240, 137/15.04; 417/53, 900
See application file for complete search history.

(56) References Cited

U.S. PATENT DOCUMENTS

| | | | | |
|---|---|---|---|---|
| 3,227,652 A | * | 1/1966 | Ackerman | 508/579 |
| 3,619,248 A | * | 11/1971 | Whitsitt et al. | 428/451 |
| 3,699,057 A | * | 10/1972 | Halko et al. | 508/528 |
| 3,767,789 A | * | 10/1973 | Rankin | 424/9.411 |
| 3,925,216 A | * | 12/1975 | Moorhouse | 508/579 |
| 4,380,948 A | * | 4/1983 | Loving et al. | 86/20.15 |
| 4,461,712 A | * | 7/1984 | Jonnes | 508/507 |
| 4,961,790 A | | 10/1990 | Smith et al. | |
| 5,120,367 A | | 6/1992 | Smith et al. | |
| 5,190,679 A | * | 3/1993 | McDonald | 508/178 |
| 5,193,942 A | | 3/1993 | Berry et al. | |
| 5,318,408 A | | 6/1994 | Davidsson | |
| 5,326,492 A | * | 7/1994 | Hodam, Jr. | 510/383 |
| 5,443,636 A | | 8/1995 | Montgomery | |
| 5,587,012 A | | 12/1996 | Montgomery | |
| 5,683,503 A | | 11/1997 | Montgomery | |
| 5,997,633 A | | 12/1999 | Montgomery | |
| 7,704,314 B2 | | 4/2010 | Inglese et al. | |
| 2004/0082728 A1 | * | 4/2004 | Wu et al. | 525/338 |
| 2007/0047379 A1 | * | 3/2007 | Barrett, Jr. | 366/6 |
| 2009/0104043 A1 | * | 4/2009 | Inglese et al. | 417/53 |

FOREIGN PATENT DOCUMENTS

| | | |
|---|---|---|
| WO | 2004/018334 A1 | 3/2004 |
| WO | WO 2004/018334 A1 * | 3/2004 |
| WO | 2005/073556 A1 | 8/2005 |

OTHER PUBLICATIONS

Specification of U.S. Appl. No. 60/537,701, filed Jan. 20, 2004, corresponding to US 2009/0104043, 16 pages.*
Dow chemical, Dow Excipients Home: Products : POLYOX products, Copyright © The Dow Chemical Company (1995-2010), 1 page.*
Ohama, Yoshihiko, Polymer-based Admixtures, Cement and Concrete Composites, 1998, vol. 20, pp. 189-212, Elsevier Science Ltd., Great Britain.
Urea Solution, product information, SIGMA Catalog No. U4883, Jul. 2007, 2 pages.
Motor Oil, Wikipedia (online encyclopedia), downloaded from internet on Dec. 8, 2010, 13 pages.
Abstract of KR 1020040076570, Jul. 26, 2005, 1 page.

* cited by examiner

*Primary Examiner* — Tony G Soohoo
(74) *Attorney, Agent, or Firm* — Myers Wolin, LLC

(57) ABSTRACT

A composition for and a method of promoting the flow of a concrete slurry through a conduit is provided. The composition is preferably a liquid polymer mixture including water and polyacrylamide polymers. The composition, when mixed with a suitable quantity of water, is useful, in a method of priming a pump, and in pumping concrete slurry, and improves the flow of the slurry through a conduit.

15 Claims, No Drawings

COMPOSITION FOR AND METHOD OF PUMPING CONCRETE

CROSS-REFERENCE TO RELATED APPLICATIONS

This application claims the benefit under 35 U.S.C. 119(e) to U.S. Application 60/710,386, filed Aug. 23, 2005, which is incorporated herein by reference in its entirety.

FIELD OF THE INVENTION

This invention relates to the movement of concrete broadly, and more particularly, to the composition and utilization of a lubricant in a concrete delivery system to coat the storage environment and delivery lines and to facilitate the movement and delivery of concrete from such storage environment. This invention further relates to materials added to concrete or otherwise employed therewith to adjust the properties or to enhance and/or to facilitate the use thereof.

BACKGROUND

It is known that concrete slurry can be prepared for use in one location, which can be remote from the place of its intended use, and then conveniently transported by known means, such as in a truck, to the place of its intended use. It is also known that concrete slurry can be prepared while being transported to the intended place of use. A truck ordinarily employed to transport concrete slurry is referred to in the art as a ready mix truck.

The movement of concrete sometimes and typically has a critical phase, that of concrete being placed without costly time delays to contractors. Concrete contractors rely on concrete pumpers to make sure the concrete is placed where they have a continuous flow without the above mentioned time delay. The time delay may have a detrimental effect on the concrete and weaken the concrete and may cause the concrete contractor to have to replace a previously poured slab or high rise, high way pillar, etc. Contractors use concrete trucks to facilitate the movement of slurries through the use of a pump and a hopper built directly into the truck.

When concrete slurry is delivered to the intended location of use, it is known that it can be caused to flow by gravity or by pumping into a form where, because of its fluid condition, it conforms to the shape of the form. After the concrete slurry is in the form it is permitted to remain undisturbed therein for a period of time sufficient to enable the cementitious material to hydrate to thereby produce the set concrete.

One of the problems involved in the placement of concrete slurry concerns the potential difficulty of causing the slurry to flow through a conduit. In this regard, it is sometimes necessary, or otherwise convenient, to place the slurry in the desired form by pressuring it, by means of a pump, through a conduit over a distance to the desired form. However, due to the nature of a concrete slurry, it has sometimes been found essential, in order to initiate movement of a slurry to and through the pump and conduit, to first fill the pump with a fluid which is easily pumped and which will lubricate the conduit itself, followed by pumping such fluid ahead of the slurry. This process is referred to as priming. Attempting to pump concrete without using a lubricant or coating of some kind could result in a very costly delay.

The prior art has addressed the problem of priming a concrete slurry pump by employing methods featuring the use of two different compositions, one of which is called a "priming grout mix" and the second of which is called a "priming slurry." The methods of priming a concrete slurry pump with either a priming grout mix or a priming slurry, as heretofore employed, are similar and suffer a common disadvantage. The disadvantage originates from the fact that the concrete slurry being pumped is not compatible and cannot be admixed with either one of the prior art priming compositions because any such admixture adversely affects the strength of the set concrete. Accordingly, when employing either one of the prior art methods, the delivery end of the conduit cannot be placed in the form until all of the priming composition has exited therefrom in order to avoid any admixing of slurry and priming composition.

Because the prior art compositions cannot be admixed with the concrete slurry, as explained above, the priming compositions must be directed to and placed in a separate location to enable hydration and subsequent disposal thereof. Accordingly, a waste disposal and potential environmental hazard inherently accompanies the use of prior art priming compositions.

Thus one problem to be solved in the prior art is to devise a composition for and a method of priming a concrete slurry pump which will not only permit a slurry to be successfully pumped, but which will also avoid the waste disposal and environmental problems associated with methods currently employed.

A priming grout mix usually consists of concrete sand, hydraulic cement and water in the weight ratio of 10 to 2 to 1, respectively. In typical practice about one-half cubic yard of priming grout mix is placed in a ready mix truck which then transports the mix to the location of the concrete slurry pump, which is ordinarily a positive displacement pump. The mix is there employed to prime the pump in order to cause a concrete slurry to move through the pump and conduit to the desired form. In the example just cited, one-half cubic yard of priming grout mix includes about 1500 pounds of sand, 300 pounds of dry cement and 150 pounds of water. In view of the fact that a ready mix truck ordinarily holds at least about 8 cubic yards of material, it is apparent that a truck employed to transport a priming grout mix is dramatically under-utilized in that it is solely used to transport a material which cannot be added to the concrete slurry.

A priming slurry typically consists of one bag of hydraulic cement dispersed in 6 or 7 gallons of water. As used herein, a bag of cement weighs about 94 pounds. Since a gallon of water weighs about 8.33 pounds, the weight ratio of cement to water in a typical priming slurry is an amount in the range of from about 1.6 to about 1.9 pounds of cement per pound of water. In practice about one-half of the required cement and water is thoroughly mixed and added to a hopper, which is in direct fluid communication with the suction side of the concrete pump, thereafter the balance of the cement and water is thoroughly mixed and added to the hopper prior to the initiation of pumping. Although use of a priming slurry does not involve an extra ready mix truck, as is required in the case of a priming grout mix as described above, it is required that extra bags of dry cement be transported to the pump location to enable on-site preparation of the priming slurry.

Another prior art method set forth in U.S. Pat. No. 5,997,633, incorporate herein by reference, involves a composition comprised of a water soluble, inorganic, alkaline material in combination with a solvatable, organic, polymeric material, when mixed with a quantity of water sufficient to dissolve the alkaline material and solvate the polymeric material. This method has the disadvantage of the dry material is hard to uncoil and absorbs and takes on water, particularly if the water is cold. Also the prior art composition includes alkaline material as added fillers, which may also continue to hydrate and present other problems associated with alkalinity. The product is also bulky and expensive to ship to customer. Customers must mix on site and allow time for the mixture to be prepared and soluble. Similarly, in WO 2005/073556, an eight ounce bag of dry composition is used, which then has to be placed in a five gallon container of water, and stirred for several minutes (or longer) so the product can uncoil, which sometimes never uncoils. A further problem with dry compositions is that it is very difficult to remove from one's hands, particularly if one's hands are wet.

Thus, the prior art solutions all suffer from the same basic problem, i.e., they start with a solid composition. As noted above, solid compositions tend to be relatively heavy, and usually require mixing for a period of time on site. Solid compositions also tend to continue hydrating. In addition, some of the particulate material used in the solid compositions tends to travel to undesirable locations either within the concrete machinery or onto the people operating the concrete pumping equipment.

On the contrary, the priming agent of the present invention does not start with a solid particulate-based composition, but instead starts with a liquid composition that overcomes the above-mentioned prior art problems associated with solid compositions. The present inventor has found that the liquid composition of the present invention is fast and effective on immediate contact with water, wets out on contact and can be sold in concentrate form, which reduces packaging weight, size and shipping costs to the customers. A liquid product also decreases wear on equipment, promotes ease and range of pumpability, is easily primed into the hopper and pumping equipment, creates a slick lubricant that reduces pressure and friction on lines and concrete pumping tubes, enhances slipperiness and thickness and viscosity of the pumping aids, coats pump wall lines for longer periods of pump time without continued hydration, and delivers lubrication and coating every time with a liquid emulsion. With the use of a liquid composition, there are also no hydration problems commonly associated with primers that start with solid compositions. It is therefore an object of the present invention to improve on the prior art through the use of a liquid polymeric emulsion as a primer aid or lubricant coating for a concrete pump system and delivery conduit.

SUMMARY

A composition of one embodiment of the invention comprises water soluble, non alkaline material in combination with a solvatable polymeric material, which when mixed with a sufficient quantity of water, is broadly useful to function as a priming aid and lubricant for a concrete slurry storage and delivery environment. More specifically, the composition is a liquid polymer mixture preferably including water and polyacrylamide polymers.

Also provided is a method of priming a concrete pump system comprising the steps of providing a liquid polymer material, mixing the liquid polymer material with water to form a lubricating aid, and pumping the lubricating aid through the concrete pump system. Also provided is a method of pumping a flowable concrete slurry comprising the steps of providing a concrete slurry, providing a fluid composition comprised of water and a polymeric material, pumping said fluid composition through a conduit wherein said conduit is lubricated by said fluid composition passing therethrough, and pumping said concrete slurry through said conduit wherein at least a portion of said slurry is in contact with at least a portion of said fluid composition, and whereby said pumped fluid composition operates to lubricate said conduit and to impede water loss from and solids separation within said concrete slurry, and dispensing said fluid composition and said concrete slurry to an outside form.

DETAILED DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof.

For purposes of this disclosure, the fluid condition of concrete, which is referred to in the art as "plastic concrete," featuring the dispersion of solids in water, is referred to herein as concrete slurry, and the monolithic solid condition of concrete is referred to herein as set concrete. The dispersed solids are usually comprised of hydraulic cement and aggregate wherein the aggregate ordinarily, but not always, consists of graded coarse aggregate, i.e. rock, mixed with graded fine aggregate, i.e. sand. Also disclosed herein is a method of using a composition to improve the viscosity of flowable concrete slurry through a conduit.

The term "hydraulic cement," as used herein, means all inorganic cementitious materials of known type which comprise compounds of calcium, aluminum, silicon, oxygen, and/or sulfur which exhibit "hydraulic activity," that is, which set solid and harden in the presence of water. Cements of this type include common Portland cements, fast setting or extra fast setting, sulfate resistant cements, modified cements, alumina cements, high alumina cements, calcium aluminate cements and cements which contain secondary components such as fly ash, pozzolana and the like. Portland cements are classified by the American Society of Testing Materials (ASTM) into five major types identified by Roman Numerals I, II, III, IV and V and by the American Petroleum Institute into at least 9 categories identified by the letters A, B, C, D, E, F, G, H and J. The classifications are based on chemical composition and physical properties. The term "hydraulic cement," as used herein, also includes a material identified as slag and mixtures thereof with Portland cement. "Slag," as used herein, means a granulated, non-crystalline, glassy material having a particle size in the range of from about 1 to about 100 microns which exhibits hydraulic activity. Slag is a blast furnace by-product formed in the production of cast iron and is broadly comprised of the oxidized impurities found in iron ore.

The hydraulic cement useful herein can also include small particle size cement which consists of discrete particles of hydraulic cement having diameters no larger than about 30 microns. Small particle size cement is more fully discussed in Ewert, et al., U.S. Pat. No. 5,121,795, which is incorporate herein by reference. The quantity of water employed in the formulation of concrete slurry useful herein is dependent upon the particle size of the cement employed. Thus, the quantity of water employed is an amount in the range of from about 0.25 to about 5.0 pounds of water per pound of dry hydraulic cement. For cements having a particle size of less than about 45 microns the preferred water to cement ratio is in the range of from about 1.0 to about 2.0 pounds of water per pound of cement. For cements which have a particle size greater than about 45 microns the preferred water to cement ratio is in the range of from about 0.3 to about 0.6 pounds of water per pound of dry cement. The quantity of aggregate employed in the formulation of concrete slurry useful herein is an amount in the range of from about 3 to about 15 pounds of aggregate per pound of dry cement. The aggregate may be entirely coarse aggregate or entirely fine aggregate or any blend thereof.

In the broadest sense, the composition of an embodiment of the invention comprises a liquid water soluble, solvatable polymeric material which, when mixed with a certain quantity of water, is broadly useful to improve the fluid characteristics of a concrete slurry. The liquid material is preferably a polymer, copolymer, and polyacrylamide emulsion. It provides a simple mixture of water, has a neutral pH, and reduces wait time compared with increased wait time with dry products, particularly when they don't uncoil. A non-limiting list of examples of preferred polymeric materials include Cytek's 1883 RS product and Ciba's 110L product.

The composition, when mixed with a sufficient quantity of water as mentioned above, forms a fluid, referred to herein as a liquid polyacrylamide solution having a pH preferably in the range of from about 6 to 9, and having a concentration preferably in the range of from about 0.5 ounces to about 2.0 ounces, and more preferably from 1 ounce to about 2.75 ounces of polyacrylamide solution. This composition is sometimes referred to herein as a priming lubricant for conduit, when employed in a method of pressuring concrete slurry through a conduit. For convenience, the composition, especially in the form of a polyacrylamide solution, is broadly referred to herein by its perceived function as a lubricant. The composition also functions to help reduce the loss of water from the concrete slurry. The composition can be used as a lubricating aid, and its use is biodegradable.

The quantity of the composition of this invention required for use is so small, that use of separate ready mix trucks devoted solely to the transportation of a priming composition is not required. In this regard when the composition is used as a priming lubricant, only about two ounces of composition per five gallons of water i.e. about 41.65 pounds of water per two ounces of additive, is sufficient to prime a conduit line used to pressure a concrete slurry through about 100 feet to 300 feet of a five inch diameter conduit. When the composition is used as a coating lubricant, about 2 ounces of polyacrylamide emulsion is required, when mixed with forty to eighty pounds of water to lubricate the conduit normally employed in the art of concrete lubricant priming. An example of the concentration of said polyacrylamide material with water is a range of from two to four ounces of polyacrylamide emulsion to 100 parts of water.

The term "solvatable, polymeric material," as used herein, means and includes a wide variety of natural, modified natural, and synthetic hydrophilic polymers which either dissolve in water or which at least form colloidal dispersions in the presence of water wherein the effect of such salvation is to produce an increase in the viscosity of the water. Such materials are generally characterized as having high molecular weight and are sometimes referred to in the art as "aqueous gelling agents" and sometimes as "aqueous viscosifiers."

The polymeric materials, as defined above, have molecular weights in the range of from about 60,000 to about 4,000,000 and higher and include polysaccharides, examples of which include galactomannan gums and glucomannan gums, which are naturally occurring; cellulose derivatives, which is cellulose modified by reaction with hydrophilic constituents: galactomannan and glucomannan gums which have been modified by reaction with hydrophilic constituents; and synthetic hydrophilic polymers. Examples of hydrophilic constituents include hydroxyalkyl groups, carboxyalkyl groups and mixed hydroxyalkyl and carboxyalkyl groups to form ether derivatives. Other constituent groups which lend hydrophilic properties to polymers include cis-hydroxyl, hydroxyl, carboxyl, sulfate, sulfonate, amino and amide groups. Guar gum, locust bean gum, karaya gum, carboxymethyiguar, hydroxyethylguar, hydroxypropylguar, carboxymethylhydroxyethylguar, carboxymethylhydroxypropylguar, carboxymethylcellulose, carboxymethylhydroxyethylceilulose, hydroxyethylcellulose, starches, alginates and carrageenans are examples of natural and modified polymeric materials useful herein. Examples of synthetic hydrophilic polymers and copolymers useful in the composition of this invention include polyethylene oxide, polypropylene oxide, polyacrylate, polymethacrylate, polyacrylamide, polymethacrylamide and copolymers thereof, maleic anhydride/methylvinyl ether copolymers, polyvinyl alcohol, polyvinylpyrrolidone, polyvinylacetate, copolymers of acrylamide and 2-acrylamido, 2-methylpropane sulfonic acid and copolymers of N,N-dimethylacrylamide and 2-acrylamido, 2-methylpropane sulfonic acid.

The solvatable, polymeric material useful herein can be either a single polymer or copolymer or a mixture of polymers and copolymers. A preferred such mixture features the presence of a modified natural polymer as mentioned above and a synthetic hydrophilic polymer as mentioned above wherein the weight ratio of synthetic polymer to modified natural polymer is an amount in the range of from about 1 to 1 to about 2 to 1. Modified natural polymers preferred for use herein are cellulose ethers, such as carboxymethylcellulose and hydroxyethylcellulose and particularly those having a molecular weight of less than about 100,000. Synthetic hydrophilic polymers preferred for use herein are poly(ethylene oxide) resins having a molecular weight of about 4,000,000. Examples of such resins are sold under the trademark POLYOX by Union Carbide Corporation. Since polyethylene oxide, when in water solution, is referred to as polyethylene ether glycol or, more simply, as poly(ethylene glycol), such compounds are within the scope of this invention.

Also the polyacrylamide polymeric material can be selected from the group consisting of galactomannan gums, glucomannan gums, cellulose derivatives, synthetic hydrophilic polymers, galactomannan and glucomannan gums which have been modified by reaction with hydrophilic constituents, and mixtures thereof.

The composition discussed herein is mixed with a quantity of water in a vessel that is in fluid communication with the suction side of the concrete pump and then pressured by the pump from the vessel into and through a conduit outside of the form. The vessel is referred to in the art as a hopper. While the mixture is being pressured into the conduit from the hopper, and at least before all of the mixture is pumped from the hopper, the concrete slurry to be pumped is added to the hopper such that a final portion of the mixture is in contact with the initial portion of the concrete slurry whereby the mixture precedes the slurry through the pump and conduit outside the form.

The quantity of composition to be utilized as a priming aid is preferably expressed in ounces as an example. Accordingly, two ounces of a composition can be placed in a bottle, a specified number of such bottles are then added to a specified number of gallons of water, and then mixed. An advantage over the prior art being that there is a minimum or no time for a set period of time to yield viscosity required to lubricate or prime the storage and delivery system. While a two ounce bottle or dispenser is disclosed, other sizes may be used as desired. The present inventor has found that two ounce bottles are optimized for shipment and for adding to standard concrete dispensing mechanisms, and such bottles can be vended in a kit for a job site with instructions for use.

In one preferred embodiment, a two ounce bottle of a preferred composition of this invention is mixed directly in the hopper with five gallons of water to produce a priming lubricant which will treat about 100 feet to 300 feet of a five inch diameter conduit. This fluid can be easily prepared for use at the location of the concrete pump by merely mixing two ounces of composition and water directly in the hopper for about one minute. This provides the advantage that a separate container is not required to prepare the priming aid. The mixture flows through the pump and conduit ahead of the concrete slurry while forming a thin film on the functioning parts of the pump and on the interior walls of the conduit to thereby lubricate the pump and the interior walls of the conduit so as to ease the movement of the slurry therethrough.

Thus, there is provided a method of pressuring a concrete slurry through a conduit, the method being comprised of the steps of introducing a fluid composition into a chamber, placing the chamber in fluid communication with the inlet end of the conduit, applying pressure to the fluid composition in the chamber in an amount sufficient to cause the fluid composition to flow from the chamber into and through the conduit to the outlet thereof, and thereafter, while continually applying the pressure, introducing the concrete slurry into the chamber such that the final portion of the fluid composition is contacted by the initial portion of the slurry, whereby the concrete slurry is pressured into and through the conduit to the outlet.

When the composition is used as a pumping and coating lube it is added directly to the hopper and mixed therewith with water to obtain a uniform dispersion of the composition. As a pumping and coating lubricant the composition functions as a lubricant for a concrete conduit, which improves or at least enhances or improves the ability to make the concrete more flowable. Thus, there is provided an improved method of formulating concrete slurry comprising the steps of mixing the composition including a polymeric, polyacrylamide and/or copolymer material in the amount in the range of from about two to four ounces of composition per twenty thousand pounds of slurry (i.e. multiple truckloads). It should be apparent from the above that the composition of this invention can be employed in any given placement operation as both a pumping lubricant and a priming lubricant. The most preferred composition is conveniently, and thus preferably, employed, in accordance with the disclosed priming and pumping methods, in two ounce quantities, prepackaged, as described above, although other quantities can be used as desired.

EXAMPLES

The following examples attached are provided to illustrate the practice of the invention as well as certain preferred embodiments thereof. The examples should not be construed as limiting in any way the spirit or scope of the invention and are not provided as such a limitation.

Various polymers from different companies were combined in small quantities (approximately two ounces) with water in a hopper to test whether the resulting composition would function to prime and lubricate a concrete pump and delivery system under normal site conditions. Properties observed included whether the composition would become slick within a one to three minute range (i.e. "Gel Time"), its dispersion and solubility, whether it would lower friction in concrete slurry in pumping conduit via a slide test, and would reduce water retention.

The tests were performed by giving two ounce samples of polymeric material to different concrete pumpers for use at the job site. One to three gallons of water was first added to a hopper of a concrete truck, followed by the addition of the sample polymeric material directly into the hopper, followed by the filling of the hopper with two to three more gallons of water, at which point the hopper is ready to use. Most of the concrete pumpers were excited about not having to mix a priming product outside of the hopper and then stir and wait until the product uncoils, which could take several minutes to overnight. All pumpers saw the benefit of not having to work with a dry composition that must be delivered to the job site and its particulate material managed during use.

Various test procedures were followed according to ASTMC 143-05, 231-04, 138-01, 39-04 and 78-02. Mixture proportions and test concrete properties were as follows:

| Material | Control | Test |
|---|---|---|
| Cement Factor (lbs/cubic yd) | 564 | 564 |
| Water (lbs/cubic yd) | 298.4 | 298.4 |
| Water-cement ratio | 0.529 | 0.529 |
| Coarse Aggregate (lbs/cubic yd) | 1750 | 1750 |
| Fine Aggregate (lbs/cubic yd) | 1204 | 1204 |
| Air Entraining Agent (oz/cwt) | 0.45 | 0.45 |
| Slump (in.) | 7 | 7 |
| Air Content (%) | 5.0 | 5.7 |
| Density (lb/ft) | 139.8 | 139.4 |

The following results were obtained:

| Product Tested | Gel Time | Slide Test | Water Retention | Dispersion | Solubility |
|---|---|---|---|---|---|
| A | Good | Fair | Good | Excellent | Good |
| B | Excellent | Good | Poor | Excellent | Excellent |
| C | Excellent | Excellent | Good | Excellent | Excellent |
| D | Good | Excellent | Fair | Good | Fair |
| E | Fair | Fair | Fair | Poor | Good |
| F | Excellent | Excellent | Excellent | Good | Excellent |
| G | Fair | Good | Poor | Fair | Fair |
| H | Excellent | Good | Poor | Excellent | Good |
| I | Good | Excellent | Fair | Excellent | Good |
| J | Good | Excellent | Poor | Good | Fair |

All products worked well, even though some exhibited better properties than others, and the properties of the hardened concrete were not compromised. The test results of the hardened concrete are as follows:

| Testing Performed | Control | Test |
|---|---|---|
| Compressive Strength (psi) | | |
| 3 days | 2570 | 2560 |
| 14 days | 3290 | 3260 |
| 28 days | 4530 | 4680 |
| Flexural Strength (psi) | | |
| 28 days | 595 | 620 |

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

I claim:

1. A method of priming a concrete pump system consisting essentially of:
   a) providing a container holding a liquid polymer material consisting essentially of at least one hydrophilic polymer and water;
   b) mixing the liquid polymer material with an additional amount of water in a vessel to form a particulate free lubricating aid; and
   c) pumping the lubricating aid through the concrete pump system.

2. The method of claim 1, wherein the mixing occurs in a hopper of a concrete truck.

3. The method of claim 1, wherein the the hydrophilic polymer is selected from the group consisting of cellulose derivatives, synthetic hydrophilic polymers and mixtures thereof.

4. The method of claim 1, wherein the liquid polymer material is an emulsion of a polymer selected from the group consisting of polyacrylamide, copolymers of polyacrylamide and mixtures thereof.

5. The method of claim 1, wherein the lubricating aid is prepared as a mixture of a range of two to four ounces of liquid polymer with three to five gallons of water.

6. The method of claim 5, wherein the mixing occurs in a hopper of a concrete truck.

7. The method of claim 1, wherein the liquid polymer material has a pH within a range of from about pH six to about pH nine.

8. The method of claim 1 wherein the liquid polymer material consists essentially of from about 0.5 ounces to about 2.0 ounces of a polyacrylamide solution.

9. The method of claim 1, wherein the concrete pump system comprises a range of from one hundred to three hundred feet of conduit that is primed with approximately two ounces of liquid polymer material.

10. The method of claim 1, wherein the lubricating aid is biodegradable.

11. The method of claim 1 where the liquid polymer material contains a modified natural hydrophilic polymer and a synthetic hydrophilic polymer wherein the weight ratio of synthetic hydrophilic polymer to modified natural hydrophilic polymer is in the range of from about 1 to 1 to about 2 to 1.

12. The method of claim 11 where the modified natural hydrophilic polymer is a cellulose ether.

13. The method of claim 11 where the synthetic hydrophilic polymer is selected from poly(ethylene oxide) resins having a molecular weight of from about 2,000,000 to about 6,000,000.

14. The method of claim 12 where the cellulose ether is selected from carboxymethylcelluose and hydroxyethylcellulose having a molecular weight of less than about 100,000.

15. The method of claim 1 where the lubricating aid consists of liquid polymer material and water.

* * * * *